United States Patent
Yellin et al.

(10) Patent No.: US 7,133,477 B2
(45) Date of Patent: Nov. 7, 2006

(54) ROBUST LOW COMPLEXITY MULTI-ANTENNA ADAPTIVE MINIMUM MEAN SQUARE ERROR EQUALIZER

(75) Inventors: Daniel Yellin, Raannana (IL); Liron Oded Ehrenwald, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 10/039,072

(22) Filed: Jan. 2, 2002

(65) Prior Publication Data

US 2003/0123583 A1    Jul. 3, 2003

(51) Int. Cl.
H04B 1/10    (2006.01)
H04B 1/38    (2006.01)

(52) U.S. Cl. .................... 375/349; 375/219; 375/350

(58) Field of Classification Search ............ 375/299, 375/261, 350, 219, 349; 370/442, 342; 455/561
See application file for complete search history.

(56) References Cited

U.S. PATENT DOCUMENTS

| | | | |
|---|---|---|---|
| 5,680,419 A | 10/1997 | Bottomley | |
| 5,852,630 A * | 12/1998 | Langberg et al. | 375/219 |
| 6,219,561 B1 * | 4/2001 | Raleigh | 455/561 |
| 6,289,062 B1 | 9/2001 | Wang et al. | |
| 6,452,981 B1 * | 9/2002 | Raleigh et al. | 375/299 |
| 6,463,099 B1 * | 10/2002 | Cao et al. | 375/232 |
| 6,662,024 B1 * | 12/2003 | Walton et al. | 455/562.1 |
| 6,665,545 B1 * | 12/2003 | Raleigh et al. | 455/562.1 |
| 2002/0141437 A1 * | 10/2002 | Meyer et al. | 370/442 |

FOREIGN PATENT DOCUMENTS

| | | |
|---|---|---|
| EP | 0 631 399 A1 | 12/1994 |
| EP | 0 948 082 A1 | 10/1999 |
| EP | 1 091 447 A1 | 4/2001 |
| WO | WO 98/18271 | 4/1998 |
| WO | WO 99/65160 | 12/1999 |

OTHER PUBLICATIONS

Balaban, "Dual Diversity Combining and Equalization in Digital Cellular Mobile Radio," IEEE Transactions on Vehicular Technology, vol. 40, No. 2, May 1991, pp. 342-354.

* cited by examiner

Primary Examiner—Khai Tran
Assistant Examiner—Cicely Ware
(74) Attorney, Agent, or Firm—Trop, Pruner & Hu, P.C.

(57) ABSTRACT

Over a channel, a signal including a desired portion associated with a desired channel and an undesired portion mixed with said desired portion may be received. Based on prior knowledge and/or empirical estimation of the desired channel and an empirical estimate of the signal cross-covariance, the desired portion from the received signal may be recovered by adaptively equalizing the channel. In one embodiment, a receiver, such as a mobile device (e.g., a cellular phone) includes a processor operably coupled to a communication interface including at least two antennas to receive the signal. The receiver may further include a MODEM that may be operably coupled to the processor, that includes an adaptive equalizer capable of detecting the signal in the presence of co-channel interference from several independent sources, inter-symbol interference and fading, for recovering the desired portion in a cellular environment with time division multiple access (TDMA) to enable digital transmission of the signal. Thus, a blind adaptive space-time equalization on the signal based on minimum mean square error (MMSE) may be provided.

22 Claims, 5 Drawing Sheets

ROBUST LOW COMPLEXITY MULTI-ANTENNA ADAPTIVE MINIMUM MEAN SQUARE ERROR EQUALIZER

BACKGROUND

The present invention relates generally to signal processing systems, and more particularly to signal detection and estimation in wireless communication systems using space-time processing techniques.

A typical wireless communication system generally comprises three main components: the transmitter, the channel, and the receiver. For instance, in a wireless digital communication system, the transmitter may process digital data from a data source, pass it through a pulse-shaping filter, and then use it to modulate a carrier signal. Then for transmission, the modulated carrier is further passed to the channel. At the receiver, the output of the channel is demodulated with the same carrier signal thus forming the baseband signal. The baseband signal is passed through a matched filter and then sampled at the symbol rate. These samples are then forwarded to a decision logic to determine the received symbols, providing the original digital data.

While in the channel, the signal is distorted and corrupted due to various phenomena, and may have significantly degraded before arriving at the receiver. Among the main reasons for this are: inter-symbol interference (ISI), fading, co-channel interference (CCI), and thermal (white) noise. The inter-symbol interference results when the data symbols contained within a data stream interfere with one another, i.e. due to undesired interaction of a wireless channel with itself. This happens because of signal bandlimiting by the channel and/or the shaping filter, and/or because the wireless channels often become multipath channels for a variety of reasons such as the presence of obstacles in the line-of-sight. Multipath also causes fading.

The co-channel interference results when two or more users operate on one radio frequency. It is very common in cellular phone systems where the same frequencies are recycled from cell to cell. Unfortunately, the transmitted signals tend to undesirably travel to non-targeted proximate cells, causing interference with the signals within a non-targeted proximate cell. Thermal (white) noise is always present in electronic devices.

Several techniques may be used to cope with such undesired effects. Essentially, for compensating the inter-symbol interference, equalization is often performed in a variety of communication systems; for compensating fading, diversity techniques are generally employed; and white noise effect is minimized by use of matched filters. On the other hand, depending on the strength of each user's signal, the co-channel interference may potentially impede accurate reception of the concerned user's data. For a particular user, any number of interference-causing sources may be located at different locations, making it extremely difficult to provide a reasonable compensation through a simple combination of the above-mentioned techniques. In addition, inconsistent behavior of the interfering sources located at unknown origins with respect to the receiver, including on/off switching, may cause the various interferences to constantly change, as an example. A fixed compensation system may fail to adequately compensate for time-varying interference, since it may not be able to follow these time-variations and remove the varying interference.

Thus, in wireless communication systems, a more effective compensation mechanism is desirable to cope with above-mentioned undesired effects.

DETAILED DESCRIPTION

Figure 1:
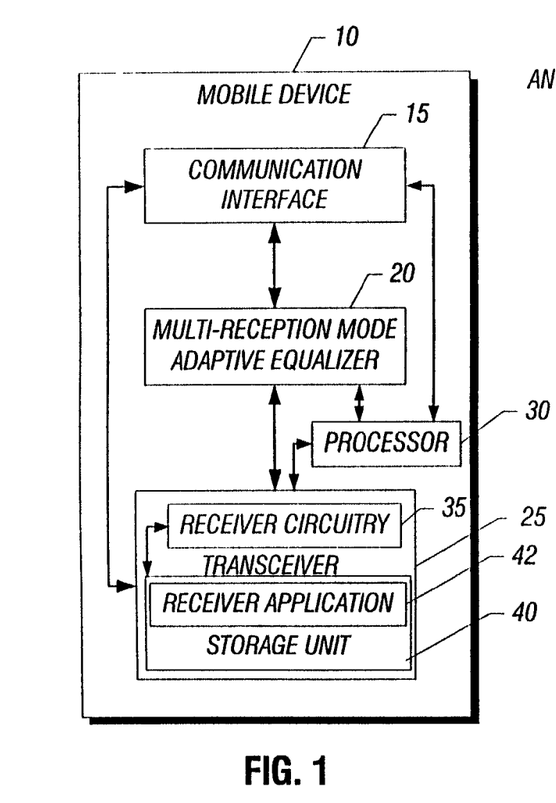
FIG. 1 is a block diagram of a mobile device including a communication interface for receiving over a channel a signal including desired and undesired portions, in accordance with one embodiment of the present invention.

A mobile device 10 shown in FIG. 1, in one embodiment, includes a communication interface 15 to communicate via one or more communication links, such as radio links. In one embodiment, the communication interface 15 receives, over a channel, a signal including a desired portion and an undesired portion. However, the mobile device 10 may receive the undesired portion of the signal in a distorted form including an interference from one or more interfering sources. The mobile device 10 may further comprise an equalizer 20, which may be coupled to the communication interface 15 to adaptively operate in a multi-reception mode.

In one embodiment, the communication interface 15 may be coupled to a processor 30 and a transceiver 25 to receive and/or may transmit one or more radio communications. The transceiver 25 further comprises receiver circuitry 35 and a storage unit 40 storing a receiver application 42 to process the radio communications according to any one of the available communication standards.

Essentially, one operation for recovering the desired portion from a signal entails using an array of at least two spatially separated antennas coupled to the communication interface 15 that receives the signal in at least two propagation signal portions through at least two propagation paths. Using the receiver application 42, the equalizer 20 may use the two propagating signal portions and a priori information related to the desired portion, to estimate a space-time cross-covariance matrix of the total received signal and the desired channel portions corresponding to the desired portion of the received signal.

Since the undesired portions of the signal are time varying and statistically inconsistent, these estimates are interpreted as adaptive weighted measures indicative of an average behavior of the channels over a time window of the signal. Based on the adaptive weighted measures, each propagating signal portion of the two propagating signal portions through the two propagation paths may be adjusted to provide corresponding equalized outputs. To remove the undesired portion from the signal, the equalized outputs may, in turn, be combined into a common output. Finally, to recover the desired portion from the signal, a threshold decision criterion may be applied to the common output.

As described earlier, one of the practical problems in digital communications is inter-symbol interference (ISI), which causes a given transmitted symbol to be distorted by other transmitted symbols. The ISI is imposed on the transmitted signal due to the bandlimiting effect of the practical channel and also due to the multipath effects (e.g., echo) of the channel. One of the most commonly used techniques to counter the channel distortion is linear channel equalization. As the equalizer is a linear filter, the equalizer provides an approximate inverse of the channel response. Since it is common for the channel characteristics to be unknown or to change over time, the equalizer may be adaptive.

Conventional equalization techniques transmit a training signal in a pre-assigned time slot (periodic for the time-variant situation). As an example, a short sequence of data, known by both the receiver and transmitter, may be used to train the equalizer such that it converges to an optimal solution before transmitting of any data. This set of known data is commonly referred to as a training sequence and is used by many adaptive equalization systems. Using a suitable adaptive algorithm (e.g. least mean square) in the receiver, the equalizer coefficients may then be changed or adapted so that the output of the equalizer closely matches the training sequence.

Figure 2:
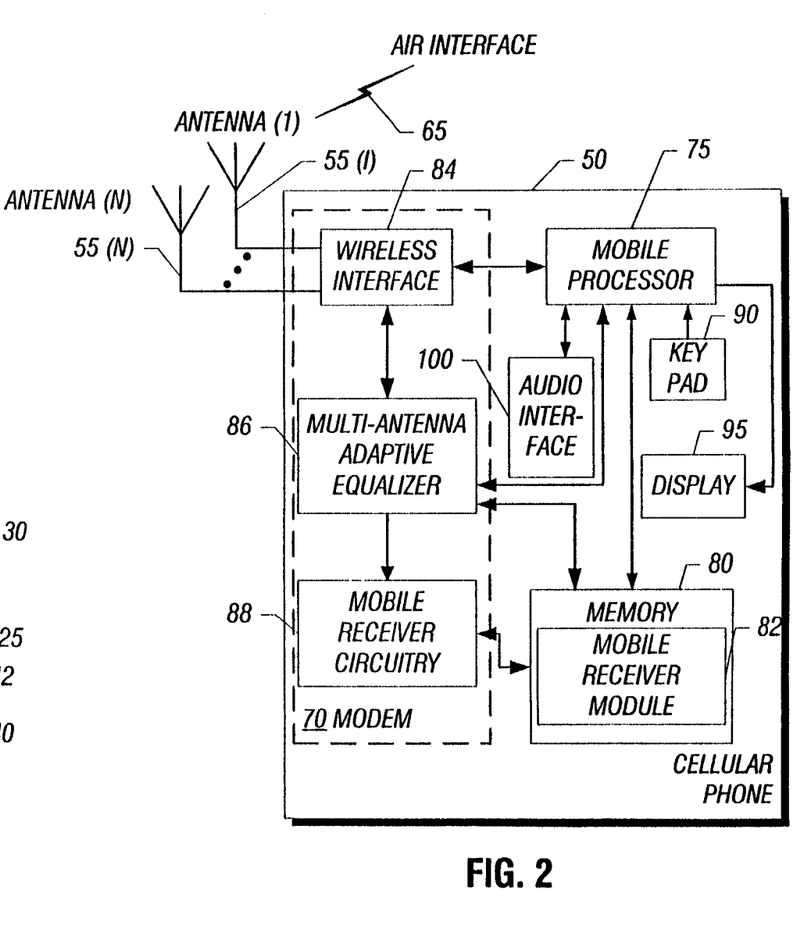
FIG. 2 is a block diagram of a cellular phone including at least two antennas to receive over an air interface (e.g., a channel) a signal (comprising desired and undesired portions), in accordance with one embodiment of the present invention.

Referring to FIG. 2, a cellular phone 50 may include antennas 55(1) through 55(N) to receive communications, such as radio communications over an air interface 65. The antennas 55(1) through 55(N) may be coupled to a modulator-demodulator (MODEM) 70 to receive over a channel a signal including a desired portion and an undesired portion (for example, due to co-channel interference from one or more sources), which may be fading and distorted (for example, due to ISI). The MODEM 70 may include a wireless interface 84, a multi-antenna adaptive equalizer 86, and a mobile receiver circuitry 88. In some embodiments, the wireless interface 84 may be a radio frequency interface. Likewise, the multi-antenna adaptive equalizer 86 may be operable in a multi-reception mode capable of detecting a signal in the presence of all the above-mentioned imperfections, in one embodiment.

A mobile processor 75 may be coupled to a memory 80. The memory 80, in some embodiments, may include a mobile receiver module 82. In one embodiment, the mobile processor 75 communicates with a keypad 90 and a display 95 to process the keypad 90 inputs and to output signals to the display 95 during normal operations. An audio interface 100 may be coupled to the mobile processor 75 for generating or receiving an audio signal. In one embodiment, the audio interface 100 may comprise a conventional microphone and a conventional speaker with a conventional encoder-decoder (CODEC) all operatively coupled together to appropriately interface with the mobile processor 75.

One operation according to a particular embodiment of the present invention involves the MODEM 70 using the adaptive equalizer 86 capable of detecting a received signal in the presence of co-channel and/or inter-symbol interference. More specifically, the MODEM 70 may be adapted to operate in a cellular environment with time division multiple access (TDMA) that enables digital transmission of a desired signal allowing a number of users to access a single radio frequency (RF) channel without interference by allocating unique time slots to each user within each channel.

To this end, one embodiment provides software for the MODEM 70 in the cellular phone 50 adapted to operate on a signal in a cellular environment with TDMA that enables a general packet radio service (GPRS) over a network for global system for mobile communications (GSM). Here, the cellular phone 50 uses at least two antennas 55(1) and 55(N), e.g., with different polarizations, although one may be inferior to the other in terms of antenna gain and thus signal to noise ratio (SNR). Detection of the signal in the presence of CCI and/or ISI may be provided, in one embodiment, by implementing the adaptive equalizer 86 with a linear minimum mean square error (MMSE).

Based on simulation and analytic analysis, in one embodiment, considerable gain may be achieved using space-time processing, by the adaptive equalizer 86 operating on the dual (or multiple) outputs of a dual (or multiple) antenna array. This may be achieved by generalizing the conventional single-antenna MMSE approach in one embodiment.

An optimal MMSE equalizer, in one embodiment may compute the (statistical) auto-covariance matrix of the received signal and cross-covariance vector of the received and the related transmitted symbols. This, in turn, may desire fall knowledge of the different channels of the wanted as well as interfering signals, from all the sources to all antennas, and the thermal noise variance may be desirable. In a GSM scenario, this type of knowledge and information is generally not available. Thus, blind methods for adjustment of the adaptive equalizer 86 are derived. Since the channel parameters are time varying, these methods ideally are adaptive in nature.

Blind adaptive space-time equalization techniques can be utilized for TDMA cellular systems in general and for GSM/GPRS in particular. In particular, using the readily available received signal, one way to estimate the above-mentioned auto-covariance matrix and cross-covariance vector, is based on approximating statistical second moments of stationary processes using time averaging.

When a receiver incorporating the adaptive equalizer 86 is used, different channel conditions may exist depending on a particular environment, as the channel is generally changing over time. Under these circumstances, using the received data, the adaptive equalizer 86 may be appropriately adapted. For instance, the adaptive equalizer 86, in one embodiment, determines the best set of equalizer parameters based on the received data. However, different types of adaptive algorithms based on any number of criteria may be used. A mean-square error may be used according to one embodiment of the present invention. A cost function-based structure may be used to define such criterion, as an example. In one embodiment, a cost function may be determined by comparing the actual output of the algorithm with a desired output while keeping the rate of convergence to a certain level, e.g., to an acceptable "average" value which may be predetermined based on a particular application.

When the received signal is shorter in length than expected or when the interfering source or sources appear and disappear frequently as is the case in GSM, this "averaging" may not be able to converge to or to track the correct auto-covariance matrix. In this case, the adaptive equalizer 86 may be adjusted accordingly, e.g., by shortening the length of the received signal. When switching times or patterns of the interfering source or sources are identifiable, in one embodiment the estimation process is reset with respect to every change while allowing the cellular system to learn the new auto-covariance matrix. If the time segments between two changes is too short, another approach avoids resetting and thus encourages the auto-covariance converge to some pre-determined "average" correct value.

The received signal may be divided into time segments, e.g., two or more segments of the same received signal, which may be equal in length, in one embodiment. The segment length may be long enough to allow the adaptive equalizer 86 computation to converge, and short enough to account for the time-variations of the interferer channels. In one embodiment, for each segment, the two received RF signals may be processed through dual analog, RF and IF stages all the way to digital baseband, using two parallel propagation paths within the receiver. The received digital baseband signals and a priori information associated with a wanted channel may be used to compute the equalizer taps according to the above explanation (e.g., one or more taps or tap values are normally adjusted for an equalizer to form an adaptive equalizer which may minimize a cost function). Finally, the adaptive equalizer 86 outputs may be summed and a decision criterion may further be applied to this sum.

Figure 3:
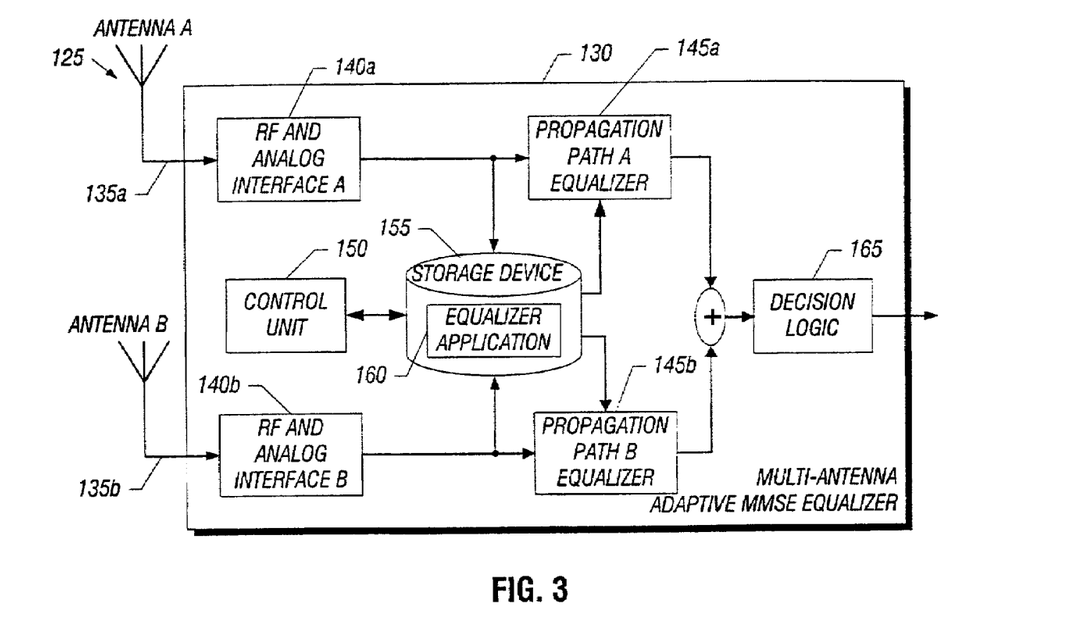
FIG. 3 is a receiver incorporating a multi-antenna adaptive equalizer for adaptively equalizing at least two propagating signal portions of a signal through at least two propagation paths according to one embodiment of the present invention.

A receiver 125 shown in FIG. 3 includes a multi-antenna adaptive minimum mean square error (MMSE) equalizer 130, which receives transmissions for processing through a first antenna 135a and a second antenna 135b. The first antenna 135a may be coupled to a radio frequency and analog interface 148a and the second antenna 135b to a radio frequency and analog interface 140b for the purposes of receiving two propagating signal portions of a signal through two propagation paths.

In one embodiment, on a propagation path equalizer 145a, a first propagating signal portion may be received, through the radio frequency and analog interface A 140a. Likewise, on a propagation path equalizer 145b, a second propagating signal portion may be received through the radio frequency and analog interface 140b. To process the signal, a control unit 150 may be coupled to a storage device 155 storing an equalizer application 160, which estimates the above-mentioned space-time auto-covariance and cross-covariance. The equalizer application 160 may provide corresponding equalized outputs combinable into a common output to remove the undesired portion from the signal. In order to recover the desired portion from the signal, a decision logic 165, for example a threshold decision criteria, may be applied to the common output.

In one embodiment, the multi-antenna adaptive MMSE equalizer 130 is a linear filter whose coefficients are time-variant. Furthermore, the coefficients are calculated each bit epoch via an adaptation, such as the linear mean square (LMS) or recursive least squares (RLS) algorithms where both adaptations may converge to provide an ideal (e.g., optimal) filter. A training preamble may be incorporated with each data transmission, consistent with the use of an LMS algorithm. Of course, blind versions of the algorithm are also possible that do not require any training sequence. Advantageously, in one embodiment, the multi-antenna adaptive MMSE equalizer 130 suppresses the interference from other active users.

Figure 4:
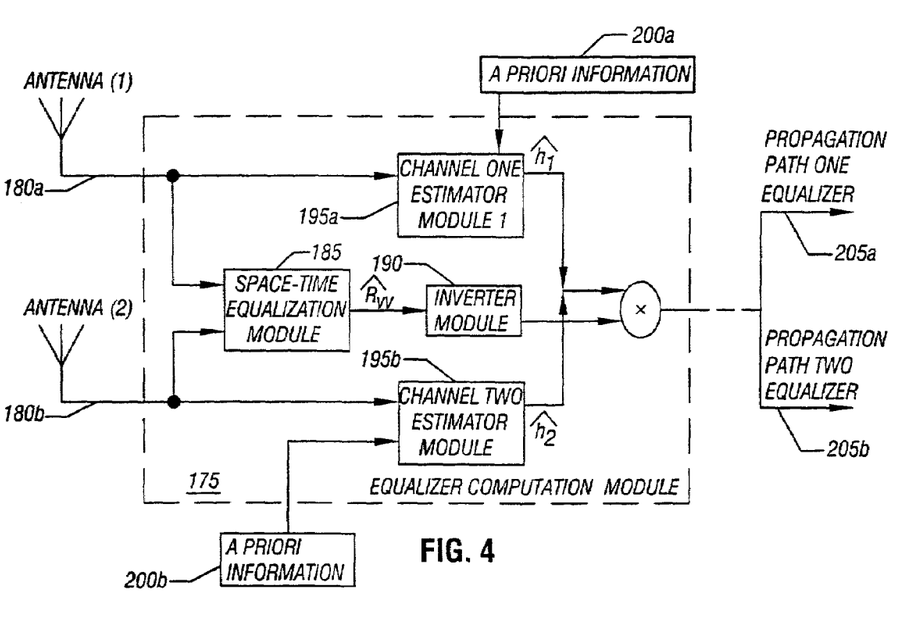
FIG. 4 is an equalizer computation module where outputs are FIR filters that adaptively perform space-time equalization on a signal received including a desired and an undesired portion to recover the desired portion from the signal such that the equalizer computation is based on adaptive estimates and/or prior information on desired channels 1 and 2, and on adaptive empirical estimate of the total received signal cross-covariance according to one embodiment of the present invention.

An equalizer computation module 175 shown in FIG. 4 may receive over a channel a signal including a desired portion and undesired portion through a first antenna 180a and a second antenna 180b spaced away from the first antenna 180a. Although only the first and second antennas 180a and 180b are shown, any number of antennas may be employed.

The equalizer computation module 175 may further include a space-time equalization module 185 coupled to an inverter module 190. In one embodiment, a channel one estimator module 195a and a channel two estimator module 195b may be provided to receive the signal in corresponding signal portions. Using the space-time equalization module 185, the equalizer computation module 175 may recover the desired portion from the signal by adaptively equalizing the channel based on prior knowledge of the desired portion and an empirical estimate of the signal. In one embodiment, the prior knowledge may be obtained from a priori information 200 being received over the channel. In operation, to remove the undesired portion from the signal being received over the channel, i.e., on a propagation path one equalizer 205a and a propagation path two equalizer 205b, a common output may be provided by combining the equalized outputs.

Figure 5:
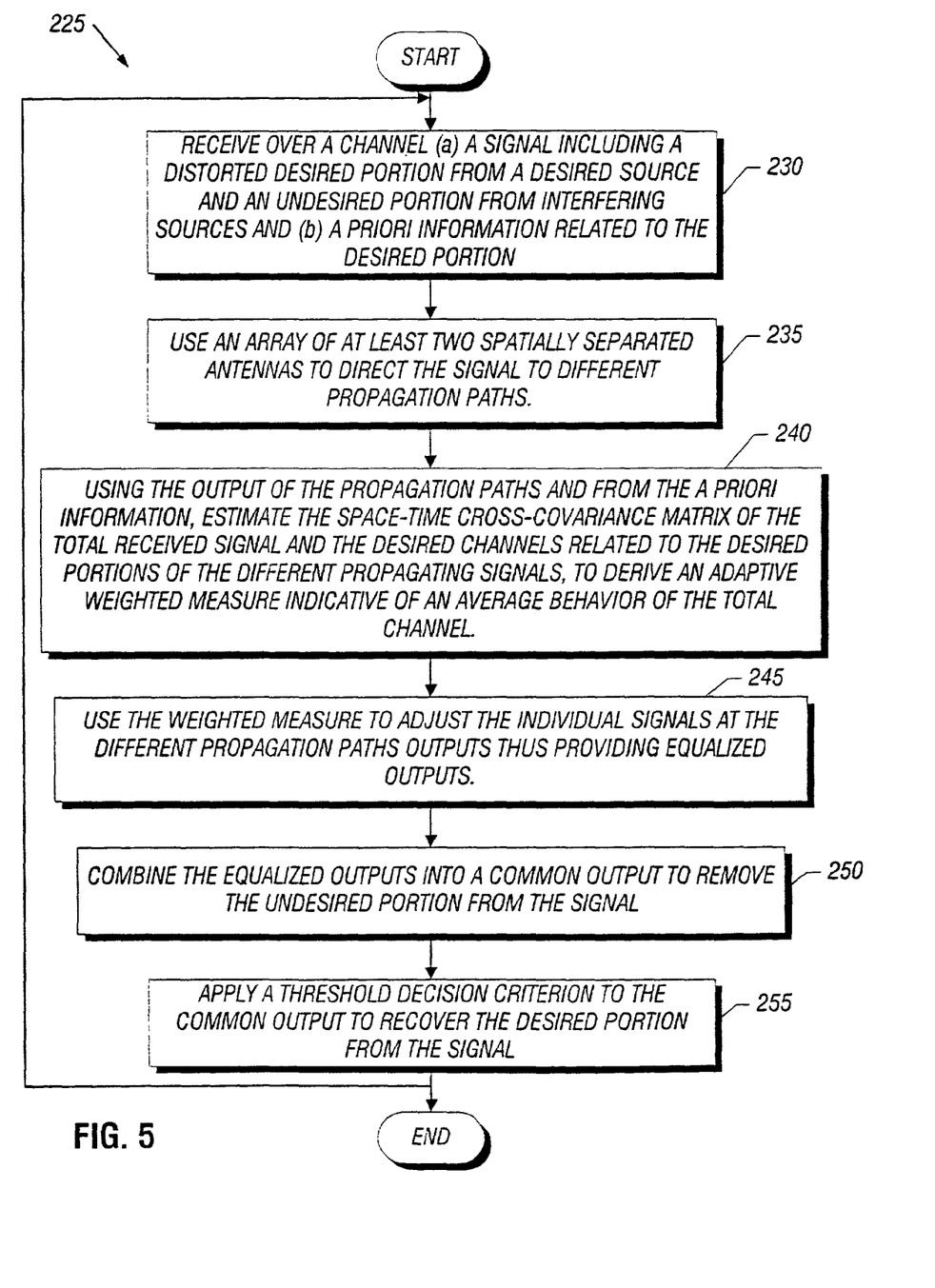
FIG. 5 is a flow chart of an adaptive equalization routine for the equalizer computation module of FIG. 4 in order to recover the desired signal from the received distorted and noisy signal over a channel incorporating co-channel and/or inter-symbol interferences in accordance with one embodiment of the present invention.

An adaptive equalizing routine 225 shown in FIG. 5 recovers the desired signal from a received signal in accordance with one embodiment of the present invention. By adaptively equalizing the channel, the desired portion may be recovered from the received signal based on prior knowledge and empirical estimation as explained earlier. A wireless signal, such as a radio communication may be received, for example, over a channel, at the block 230.

However, the wireless signal may incorporate a variety of interferences including, but not limited to, co-channel interference and inter-symbol interference. While the wireless signal may include, in one embodiment, a desired set of channel portions, an undesired distorted portion may be attributed to co-channel and/or inter-symbol interferences as examples.

An array of at least two spatially separated antennas may be used to receive the wireless signal into at least two propagating signal portions through at least two propagation paths in the block 235. In one embodiment, the desired portion of the wireless signal may be received from a desired source (e.g., a base station operating in a cellular network to service a plurality of active mobile devices). A priori information related to the desired portion may also be received over the channel to derive the prior knowledge along with the undesired portion of the wireless signal. The undesired portion may be in a distorted form caused by an interference from one or more interfering sources (e.g., one or more other base stations of the cellular network currently not servicing the active mobile devices).

From the at least two propagating signal portions and the a priori information related to the desired portion, a space-time cross-covariance matrix of the wireless signal and the set of desired channel portions corresponding to the desired portion may be estimated at the block 240. According to one embodiment, an adaptive weighted measure indicative of an average behavior of the channel over a first time-variant window of the wireless signal may be derived. Using the adaptive weighted measure, the wireless signal may be estimated across a second time-variant window.

Specifically, in one case, to provide corresponding equalized outputs each propagating signal portion of the two propagating signal portions through the at least two propagation paths may be adjusted based on the adaptive weighted measure in block 245. The equalized outputs may be combined into a common output to remove the undesired portion from the wireless signal at the block 250. Finally, a threshold decision criterion may be applied to the common output to recover the desired portion from the wireless signal in one embodiment (block 255).

In some embodiments, interference patterns may be observed in a channel to derive empirical estimate based on at least two propagating signal portions of the wireless signal, which may be received through at least two propagation paths. The undesired portion may be extracted from the wireless signal based on the empirical estimate of the wireless signal. By averaging the temporal transitions of the interference patterns across the two propagating signal portions, the desired portion may be derived from the wireless signal.

Different components and the signal flow of a receiver based on an adaptive equalizer consistent with one embodiment of the present invention may be implemented in dual. For example, in a GSM, a dual structure of the adaptive equalizer, i.e., comprising dual antennas, dual radio frequency, and analog stages for interference (e.g., ISI, CCI, or both) reduction or cancellation using minimum mean square error (MMSE) may be provided.

In accordance with one particular embodiment, a set of relevant formulas are illustrated for a finite length dual MMSE linear equalizer, e.g., the multi-antenna adaptive MMSE equalizer 130 as a generalization of a dual MMSE linear equalizer capable of direct adaptation. In doing so, let $S0(n)$ denote the symbol transmitted at time n and let $$V = [v_1(1)v_1(2) \ldots v_1(N)v_2(1)v_2(2) \ldots v_2(N)]^T \quad (1)$$

denote the received signal of N dual antenna samples over an entire burst. Define $$\underline{v(n)} = [v_1(n+d_1+L1) \ldots v_1(n+d_1) \ldots v_1(n+d_1-L2)v_2(n+d_1+L1) \ldots v_2(n+d_1) \ldots v_2(n+d_1-L2)]^T \quad (2)$$

where $d_1$ is the symbol delay over channel 1. It is desired to estimate $S0(n)$ as $$\hat{S}0(n) = C^+ \cdot \underline{v(n)} \quad (3)$$
$$= C1^+ \cdot \underline{v1(n)} + C2^+ \cdot \underline{v2(n)}$$
$$= \sum_{j=-L1}^{+L2} c1_j^* v_1(n+d_1-j) + \sum_{j=-L1}^{+L2} c2_j^* v_2(n+d_1-j)$$

The most direct arrival at the solution is through the underlying orthogonality principle, $$E\{[S0(n) - \hat{S}0(n)]\underline{v(n)}^*\} = \underline{0}. \quad (4)$$

In this equation $$E\{S0(n)\underline{v(n)}^*\} = r_{vS0} = [h01_{L1+d_1} \ldots h01_{0+d_1} \ldots h01_{-L2+d_1} h02_{L1+d_1} \ldots h02_{0+d_1} \ldots h02_{-L2+d_1}]^+ \quad (5)$$

and $$E\{\hat{S}0(n)\underline{v(n)}^*\} = \begin{bmatrix} R_{11} & R_{12}^+ \\ R_{12} & R_{22} \end{bmatrix} \begin{bmatrix} C1 \\ C2 \end{bmatrix} = R_{vv}\underline{C} \quad (6)$$

$$= \begin{bmatrix} r_{11}(0) & \cdots & r_{11}(-L1) & \cdots & r_{11}(-L1-L2) & r_{21}(0) & \cdots & r_{21}(-L1) & \cdots & r_{21}(-L1-L2) \\ \vdots & \ddots & \vdots & & \vdots & \vdots & \ddots & \vdots & & \vdots \\ r_{11}(+L1) & \cdots & r_{11}(0) & \cdots & r_{11}(-L2) & r_{21}(+L1) & \cdots & r_{21}(0) & \cdots & r_{21}(-L2) \\ \vdots & & \vdots & \ddots & \vdots & \vdots & & \vdots & \ddots & \vdots \\ r_{11}(+L1+L2) & \cdots & r_{11}(+L2) & \cdots & r_{11}(0) & r_{21}(+L1+L2) & \cdots & r_{21}(+L2) & \cdots & r_{21}(0) \\ r_{12}(0) & \cdots & r_{12}(-L1) & \cdots & r_{12}(-L1-L2) & r_{22}(0) & \cdots & r_{22}(-L1) & \cdots & r_{22}(-L1-L2) \\ \vdots & & \vdots & & \vdots & \vdots & \ddots & \vdots & & \vdots \\ r_{12}(+L1) & \cdots & r_{12}(0) & \cdots & r_{12}(-L2) & r_{22}(+L1) & \cdots & r_{22}(0) & \cdots & r_{22}(-L2) \\ \vdots & & \vdots & & \vdots & \vdots & & \vdots & \ddots & \vdots \\ r_{12}(+L1+L2) & \cdots & r_{12}(+L2) & \cdots & r_{12}(0) & r_{22}(+L1+L2) & \cdots & r_{22}(+L2) & \cdots & r_{22}(0) \end{bmatrix}$$

$$[c1_{-L1}^* \cdots c1_0^* \cdots c1_{+L2}^* c2_{-L2}^* \cdots c2_0^* \cdots c2_{+L2}^*]^T,$$

where $$r_{12}(+k) = E\{v_1(k)v_2(k-k)^*\} = \sum_{l=0}^{l} \sum_j h1_{l_j} h2_{j-k}^* \quad (7)$$

$$r_{12}(-k) = E\{v_1(k)v_2(k+k)^*\} = \sum_{l=0}^{l} \sum_j h1_{l_j} h2_{j+k}^*$$

$$r_{11}(+k) = E\{v_1(k)v_1(k-k)^*\} = \sum_{l=0}^{l} \sum_j h1_{l_j} h1_{j-k}^* + N1\delta(k)$$

$$r_{11}(-k) = E\{v_1(k)v_1(k+k)^*\} = \sum_{l=0}^{l} \sum_j h1_{l_j} h1_{j+k}^* + N1\delta(k)$$

$$r_{22}(+k) = E\{v_2(k)v_2(k-k)^*\} = \sum_{l=0}^{l} \sum_j h2_{l_j} h2_{j-k}^* + N2\delta(k)$$

-continued $$r_{22}(-k) = E\{v_2(k)v_2(k+k)^*\} = \sum_{l=0}^{I}\sum_{j} hl2_j hl2_{j+k}^* + N2\delta(k)$$

$$r_{21}(k) = r_{12}(k)^*.$$

The solution is given by $$\underline{C}^+ = R_{vv}^{-1} r_{vS0}. \quad (8)$$

If the 2(1+I) channels of wanted and interfering signals are unknown, the received signal covariance matrix $R_{vv}$ and the transmitted-received cross-covariance vector $r_{vS0}$ may be estimated from the received signal itself. The components of the covariance matrix may be estimated as $$\hat{r}_{11}(k) = \frac{1}{N}\sum_{i=1}^{N} v_1(i)v_1(i-k)^* \quad (\hat{r}_{12}, \hat{r}_{21}, \hat{r}_{22} \text{ computed similarly}) \quad (9)$$

The components of the cross-correlation vector, which are in fact the components of the desired channels, may be estimated using conventional channel estimation techniques, but in this study we assume the are known, for the sake of simplicity. Thus, the equalizer solution in this case is given by $$\hat{\underline{C}}^+ = \hat{R}_{vv}^{-1} r_{vS0} \quad (10)$$

where $\hat{R}_{vv}^{-1}$ is the inverse of the correlation matrix estimated according to the equation (9). By repeating this estimation after every data block, tracking is performed, and the equalization is rendered adaptive for slow fading and hopping.

Figure 6:
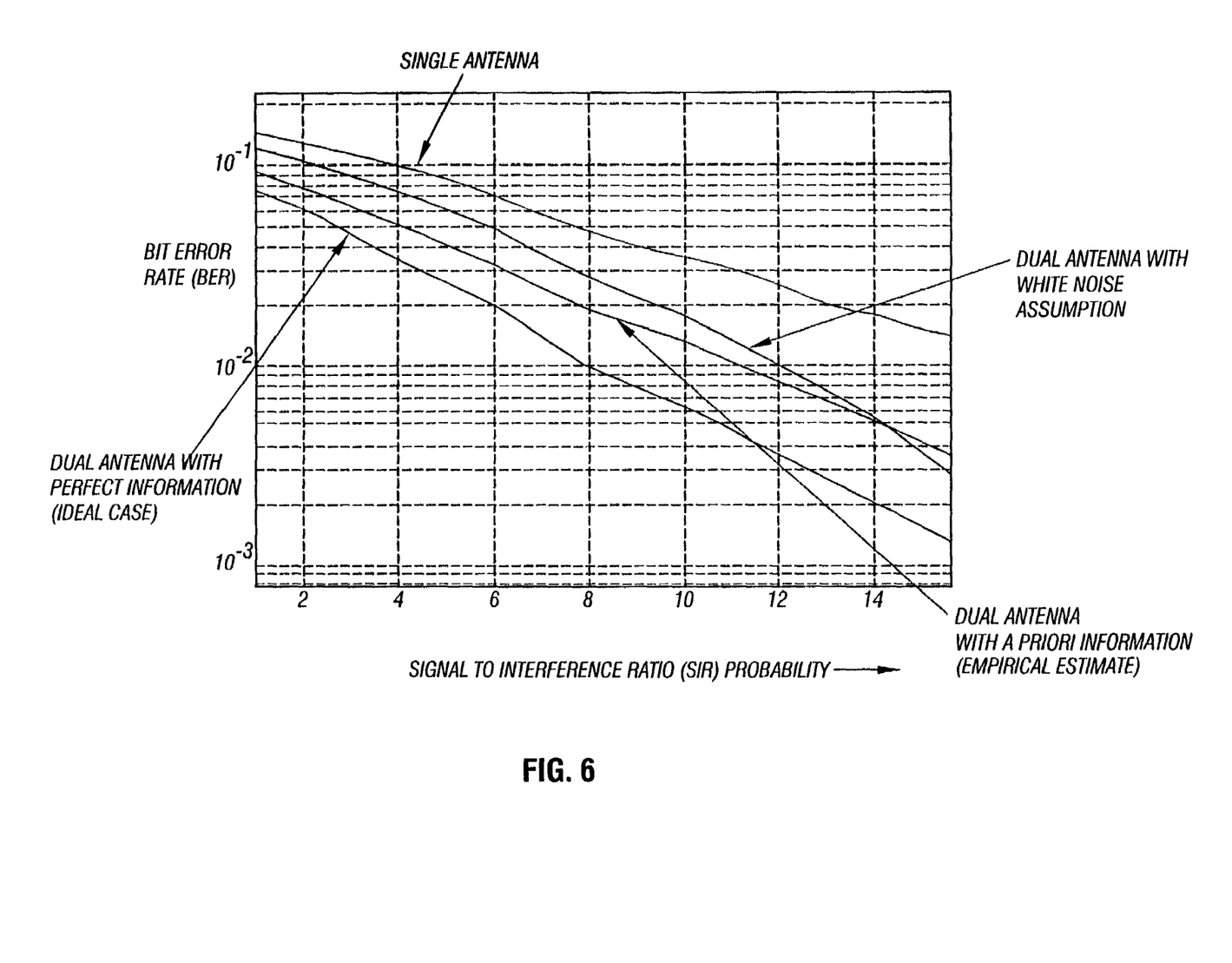
FIG. 6 is a chart comparing uncoded bit error rate (UBER) performance of several minimum mean square error (MMSE) equalizer-based receivers according to one embodiment of the present invention.

A chart shown in FIG. 6 compares simulated bit error rate (BER) performance of several minimum mean square error (MMSE) equalizer-based receivers according to one embodiment of the present invention. During a transmission, for example, over a channel, the bit error rate (BER) is defined as the percentage of bits that have errors relative to the total number of bits received in the transmission, usually expressed as ten to a negative power. For example, a transmission may have a BER of 10 to the minus 6 as power, i.e., out of every 1,000,000 bits transmitted, one bit was in error. In general, the BER indicates how often a packet or other data unit has to be retransmitted because of an error.

As indicated in FIG. 6, the BER performance of four MMSE equalizer-based receivers is compared. By simulating a GSM scenario, a 157 symbol burst is produced, to be subsequently processed by a conventional transmit Gaussian filter, and transmitted via a fading multipath channel. At the receiver, nine interferers of different origins and strengths plus thermal noise add to the fading and ISI-corrupted wanted signal. For the typical working points of 9 and 12 decibel (dB) signal to interference ratio (SIR), the performance of the dual antenna MMSE equalizer consistent with one embodiment of the present invention, is closer to the unrealizable perfect information equalizer receiver, showing that a gain of approximately 4 dB may be obtained. Further simulation experiments established the observation that with a dual antenna MMSE receiver as formulated above, the BER performance is significantly better than with any single antenna receiver.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving at least two propagating signal portions of a received signal through at least two propagation paths;
observing the received signal patterns in the channel to derive an empirical estimate;
extracting the undesired portion from the signal based on the empirical estimate of the received signal;
averaging the temporal transitions of the interference patterns across the at least two propagating signal portions to derive the desired portion from the received signal;
operating on the channel using said at least two propagation paths to compute a measure indicative of an average behavior of the channel; and
estimating the received signal based on said measure.

2. The method of claim 1 comprising:
receiving over a channel a signal including a desired portion associated with a desired channel and an undesired portion mixed with said desired portion; and
recovering the desired portion from the signal by adaptively equalizing the channel based on empirical estimation of the received signal auto-covariance and at least one of prior knowledge or empirical estimation of the desired channel.

3. The method of claim 2, receiving said signal including:
receiving the desired portion of the signal including desired channel portions of said channel from a desired source;
receiving a priori information related to the desired portion over said channel to derive said prior knowledge; and
receiving the undesired portion of the signal in a distorted form including an interference from one or more interfering sources.

4. The method of claim 3, including:
using an array of at least two spatially separated antennas to receive the signal into at least two propagating signal portions through at least two propagation paths.

5. The method of claim 4, including:
estimating a space-time cross-covariance matrix of the received signal and the desired channel from said at least two propagating signal portions and said a priori information related to the desired portion over a signal burst; and
deriving one or more equalizer coefficients that are based on averaging of the received signal over a time window that corresponds to the signal burst.

6. The method of claim 5, including:
adjusting each propagating signal portion of said at least two propagating signal portions through said at least two propagation paths based on the one or more equalizer coefficients to provide corresponding equalized outputs;
combining said equalized outputs into a common output to remove the undesired portion from the received signal; and applying a threshold decision criterion to the common output to recover the desired portion from the received signal.

7. The method of claim 1, including providing an adaptive equalization by periodically repeating the empirical estimation of the desired channel, and the received signal auto-covariance.

8. A method comprising:
receiving one or more data symbols in a received signal over the channel; and
estimating an auto-covariance matrix of the received signal and a cross-covariance vector of the received signal and transmitted one or more data symbols by manipulating and averaging the received signal over at least two signal portions of the signal in parallel over a first and a second propagation paths.

9. The method of claim 8, including adaptively adjusting equalization parameters of the channel based on a plurality of first samples of the received signal collected in said first propagation path and a plurality of second samples of the received signal collected in said second propagation path.

10. The method of claim 9, including:
operating on the channel in a dual reception mode in order to extract the undesired portion to increase gain of the signal; and
separating said desired portion from said signal in said first and second propagation paths by removing said undesired portion from the received signal.

11. An apparatus, comprising:
a processor;
a communication interface operably coupled to said processor to receive over a channel a signal including a desired portion associated with a desired channel and an undesired portion mixed with said desired portion;
a device operably coupled to said processor to recover the desired portion from the signal, said device to use an array of at least two spatially separated antennas to receive the signal in at least two propagating signal portions through at least two propagation paths; and
said device to average the temporal transitions of the interference patterns across the at least two propagating signal portions to derive the desired portion from the received signal and operate on the channel using said at least two propagation paths to compute a measure indicative of an average behavior of the channel.

12. The apparatus of claim 11, wherein said communication interface includes at least two antennas.

13. The apparatus of claim 11, wherein said device is a MODEM.

14. The apparatus of claim 13, wherein said MODEM includes an equalizer capable of detecting said signal in the presence of at least one of co-channel and inter-symbol interferences.

15. The apparatus of claim 14, wherein said MODEM is adapted to operate in a cellular environment with time division multiple access to enable digital transmission of the signal allowing a number of users to access a single radio frequency channel without interference by allocating unique time slots to each user within each channel.

16. The apparatus of claim 11, wherein said device is an adaptive equalizer providing a blind adaptive space-time equalization on said signal based on minimum mean square error that reduces an interference in an asynchronous time division multiple access cellular system.

17. The apparatus of claim 11, said device to further:
receive at least two propagating signal portions of the received signal through at least two propagation paths;
observe the received signal patterns in the channel to derive said empirical estimate; extract the undesired portion from the signal based on the empirical estimate of the received signal;
estimate the received signal based on said measure; and
providing an adaptive equalization by periodically repeating the empirical estimation of the desired channel, and the received signal auto-covariance.

18. The apparatus of claim 17, said device to further:
estimate a space-time cross-covariance matrix of the received signal and the desired channel from said at least two propagating signal portions and said a priori information related to the desired portion over a signal burst; and
derive one or more equalizer coefficients that are based on averaging of the received signal over one signal burst.

19. The apparatus of claim 18, said device to further:
adjust each propagating signal of said at least two propagating signal portions through said at least two propagation paths based on the one or more equalizer coefficients to provide corresponding equalized outputs;
combine said equalized outputs into a common output to remove the undesired portion from the received signal; and
apply a threshold decision criterion to the common output to recover the desired portion from the received signal.

20. An article comprising a medium storing instructions that enable a processor-based system to:
receive over a channel a signal including a desired portion associated with a desired channel and an undesired portion mixed with said desired portion;
recover the desired portion from the signal by adaptively equalizing the channel based on empirical estimation of the received signal auto-covariance and at least one of prior knowledge or empirical estimation of the desired channel; and
provide adaptive equalization by periodically repeating the empirical estimation of the desired channel and the received signal auto-covariance.

21. The article of claim 20, further storing instructions that enable the processor-based system to use an array of at least two spatially separated antennas to provide the signal into at least two propagating signal portions through at least to propagation paths.

22. The article of claim 21, further storing instructions that enable the processor-based system to:
estimate a space-time cross-covariance matrix of the received signal and the desired channel from said at least two propagating signal portions and said a priori information related to the desired portion over a signal burst;
derive one or more equalizer coefficients that are based on the average of the received signal over a time window that is substantially same as the signal burst;
adjust each propagating signal portion of said at least two propagating signal portions through said at least two propagation paths based on the one or more equalizer coefficients to provide corresponding equalized outputs;
combine said equalized outputs into a common output to remove the undesired portion from the received signal; and
apply a threshold decision criterion to the common output to recover the desired portion from the received signal.

* * * * *

UNITED STATES PATENT AND TRADEMARK OFFICE
CERTIFICATE OF CORRECTION

PATENT NO. : 7,133,477 B2
APPLICATION NO. : 10/039072
DATED : November 7, 2006
INVENTOR(S) : Daniel Yellin and Liron Oded Ehrenwald It is certified that error appears in the above-identified patent and that said Letters Patent is hereby corrected as shown below:

Claim 1, line 14:

Please delete:
observing the received signal patterns in the channel to

Replace with:
observing received signal patterns in a channel to

Claim 1, line 16:

Please delete:
extracting the undesired

Replace with:
extracting an undesired

Claim 1, line 18:

Please delete:
averaging the temporal transitions of the interference

Replace with:
averaging temporal transitions of interference

Claim 1, line 20:

Please delete:
derive the desired

Replace with:
derive a desired

UNITED STATES PATENT AND TRADEMARK OFFICE
CERTIFICATE OF CORRECTION

PATENT NO. : 7,133,477 B2
APPLICATION NO. : 10/039072
DATED : November 7, 2006
INVENTOR(S) : Daniel Yellin and Liron Oded Ehrenwald It is certified that error appears in the above-identified patent and that said Letters Patent is hereby corrected as shown below:

Claim 2, line 27:

Please delete:
over a channel

Replace with:
over the channel

Signed and Sealed this

Eighteenth Day of September, 2007

JON W. DUDAS
*Director of the United States Patent and Trademark Office*